(12) United States Patent
Peebles et al.

(10) Patent No.: US 11,509,730 B1
(45) Date of Patent: Nov. 22, 2022

(54) ANALYZING WEB SERVICE FRONTENDS TO EXTRACT SECURITY-RELEVANT BEHAVIOR INFORMATION

(71) Applicant: Amazon Technologies, Inc., Seattle, WA (US)

(72) Inventors: Daniel George Peebles, Richland, VA (US); Carsten Varming, Brooklyn, NY (US); Neha Rungta, San Jose, CA (US); Zhen Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 68 days.

(21) Appl. No.: 17/119,238

(22) Filed: Dec. 11, 2020

(51) Int. Cl.
*H04L 67/51* (2022.01)
*H04L 9/40* (2022.01)
*H04L 67/133* (2022.01)

(52) U.S. Cl.
CPC .............. *H04L 67/51* (2022.05); *H04L 63/10* (2013.01); *H04L 63/20* (2013.01); *H04L 67/133* (2022.05)

(58) Field of Classification Search
CPC ................................ H04L 63/10; H04L 63/20
See application file for complete search history.

(56) References Cited

U.S. PATENT DOCUMENTS

2017/0374177 A1\* 12/2017 Chrysanthakopoulos ................. H04L 67/1095

\* cited by examiner

*Primary Examiner* — Esther B. Henderson
(74) *Attorney, Agent, or Firm* — Nicholson De Vos Webster & Elliott LLP

(57) ABSTRACT

Techniques are described for generating a specification of security-relevant behavior associated with web services of a cloud provider network. Source code or software development artifacts associated with an implementation of a web service is obtained, where the source code of software development artifacts include an implementation of a request handler for an action of the service. The request handler includes a request authorization component, e.g., which may involve interaction with an identity and access management service of the cloud provider network to authenticate and authorize requests and may further rely upon one or more authorization contexts included in the requests received by the request handler. An interprocedural data flow analyzer is used to analyze a model representation of the bytecode to identify and generate specifications of authorization patterns associated with the request handler.

20 Claims, 8 Drawing Sheets

US 11,509,730 B1

ANALYZING WEB SERVICE FRONTENDS TO EXTRACT SECURITY-RELEVANT BEHAVIOR INFORMATION

BACKGROUND

As an increasing number of applications and services are being made available over networks such as the internet, an increasing number of content, application, and service providers are turning to technologies such as cloud computing. Cloud computing, in general, is an approach to providing access to electronic resources through services, such as web services, where the hardware and software used to provide those services is dynamically scalable to meet the needs of users of the services at any given time. A user (or "customer") typically rents, leases, or otherwise pays for access to resources provided by a service provider's system and thus can avoid purchasing and maintaining the underlying hardware and software at a customer's site. Cloud computing providers typically provides hundreds of such web services, each with their own request authentication, authorization, and other security-relevant behavior.

BRIEF DESCRIPTION OF DRAWINGS

Various embodiments in accordance with the present disclosure will be described with reference to the drawings, in which.

DETAILED DESCRIPTION

Figure 1:
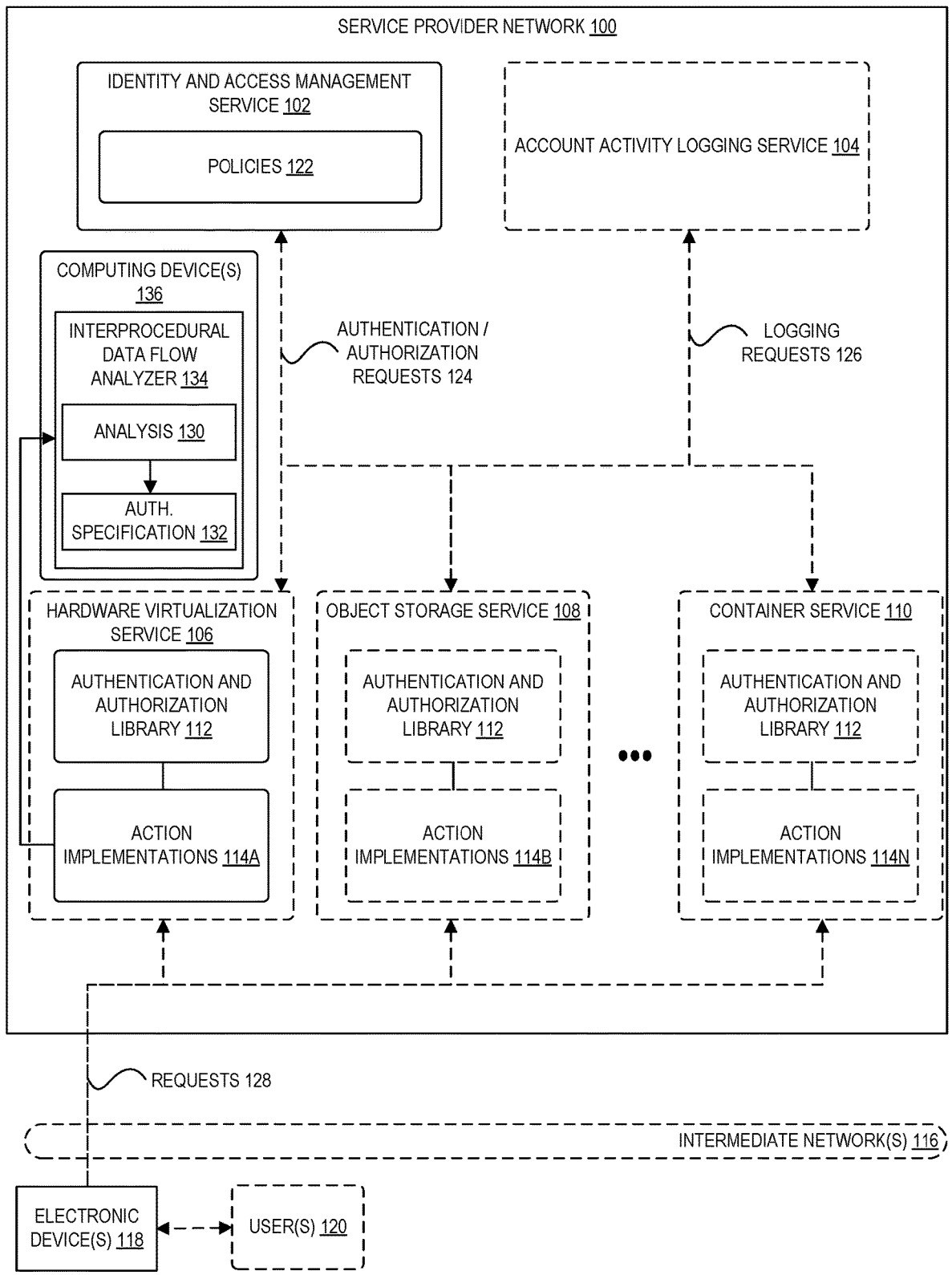
FIG. 1 is a diagram illustrating an environment in which a cloud provider network includes various web services, each associated with respective security-relevant behavior when processing requests to perform actions, according to some embodiments.

The present disclosure relates to methods, apparatus, systems, and non-transitory computer-readable storage media for generating specifications of authorization and security-relevant behavior associated with web services of a cloud provider network. According to some embodiments, source code or other software development artifacts (e.g., bytecode) associated with an implementation of a web service is obtained, where the source code or other software development artifacts include an implementation of a request handler for an action of the web service (e.g., an action to create a storage resource using an object storage service, or to launch a compute instance using a hardware virtualization service). The request handler includes a request authorization component, the operation of which may involve interaction with an identity and access management service of the cloud provider network to authenticate and authorize requests and which may further rely upon one or more authorization contexts (e.g., condition keys, policy variables, or any key-value pairs used to evaluate access policies for principals generating the requests) included in the requests received by the request handler. According to embodiments described herein, an interprocedural data flow analyzer is used to analyze a model representation of the source code or software development artifacts (e.g., an intermediate language representation, a control flow graph, abstract syntax trees, etc.) to identify and generate specifications of authorization and other security-related patterns (e.g., identifications of authorization contexts used, instances of authorization calls to an identity and access management service, instances of calls to an account activity logging service, etc.). The specifications of security-relevant behavior can be used, for example, to generate web service-related documentation describing such authorization behaviors and associated data, thereby providing for more complete and accurate descriptions of web services functionality and use, as well as for use in other types of program analysis tools.

Cloud provider networks typically provide hundreds of separate web services including, e.g., various types of computing-related services, storage-related services, networking-related services, and the like. Each of these services includes respective application programming interfaces (APIs) having any number of actions exposed to users of the services (e.g., actions to create, modify, or delete various types of resources, among other types of actions). A web service receiving a request to carry out a given action may first perform complex authorization, logging, and other action-specific operations such as using service-specific authorization contexts (e.g., condition keys, policy variables, etc.) to ensure that requestor is authorized to invoke the action. Documentation about the security-related behavior of such actions may often include incomplete or incorrect information, and keeping such documentation in sync with the development of the web service implementations is highly challenging. Incorrect or incomplete documentation can result in an inability for users and applications to use the services as intended, thereby degrading the operation of the web services as a whole.

These challenges, among others, are addressed by techniques described herein for using interprocedural data flow analysis techniques to generate specifications of authorization and other security-related patterns associated with actions exposed by a web service. According to embodiments, the interprocedural data flow analysis techniques involve analyzing the implementation of request handlers associated with web services' actions to automatically obtain such authorization and security-related specifications. Among other benefits, the automatic extraction of such authorization and security-related pattern information for web services implementations enables the generation of accurate web service specifications, enabling more precise and effective use of the web services by users and other applications, as well as for use in other program and security-related analysis tools.

FIG. 1 is a diagram illustrating an environment in which a cloud provider network includes various web services, each associated with respective security-relevant behavior when processing requests, according to some embodiments. A provider network 100 (or "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service 106 that can execute compute instances, an object storage service 108 that can store data objects, a container service 110 that can execute containers, etc. The users (or "customers") (e.g., user(s) 120) of provider networks 100 may utilize one or more user accounts that are associated with a customer account, though these terms may be used somewhat interchangeably depending upon the context of use. Users may use electronic device(s) 118 to interact with a provider network 100 across one or more intermediate networks 116 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network 100 typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 100 can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance (s) involved.

The hardware virtualization service 106 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs) and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

The container service 110 can be a container orchestration and management service (referred to in various implementations as a container service, cloud container service, container engine, or container cloud service) that allows users of the cloud provider network to instantiate and manage containers. In some embodiments the container service 110 may be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

As shown in FIG. 1, users 120 of a cloud provider network 100 use electronic device(s) 118 to interact with various services provided by the provider network 100, e.g., by sending requests 128 to request various actions. For example, a user 120 might interact with a hardware virtualization service 106 to launch or configure VM instances, interact with an object storage service 108 to create storage resources and to store data objects, interact with a container service 110 to launch containers, etc. In some embodiments, a user 120 or application can interact with the web services via any of a management console, API, command line interface (CLI), or any other type of interface to request the performance of desired operations.

In some embodiments, when a principal (e.g., a user or a role) interacts with a cloud provider network service (e.g., via a management console, API, CLI, etc.), the principal sends a request 128 to the cloud provider network 100. A request 128, for example, may include some or all of the following information: the action or operations that the principal desires to perform, the resource object(s) upon which the actions or operations are to be performed, the person or application associated with the principal (e.g., a user or a role) sending the request, environment data (e.g., IP addresses, user agents, SSL enabled status, etc.), and data related to the resource(s) that are being requested (e.g., a database table name or a tag on a VM instance). This request information is gathered into a request context, which the services and identity and access management service 102 can use to authenticate and authorize the requests.

In some embodiments, the action implementations 114A-114N correspond to actions or operations defined by each of the respective services. Example actions or operations include viewing information about a resource (e.g., a VM instance, a storage object, a database, etc.), creating a resource, editing a resource, and deleting a resource. Furthermore, each cloud provider network web service can define actions, resources, and authorization contexts for use in access policies 122 managed by an identity and access management service 102 (e.g., policies used to determine whether or not to allow execution of a requested action). While most actions defined by a service can be used in a policy 122 (e.g., to specify conditions on the use of the action), a service might also define some actions that do not directly correspond to a publicly accessible API operation (e.g., some actions may be executed only by the service itself). In addition to standard policy statements, in some embodiments, a cloud provider network 100 provides a set of common authorization contexts (e.g., global context keys) that are supported by most or all services that support policies. These authorization contexts generally correspond to key-value pairs included in requests to the web service and are used to evaluate access policies 122 for principals generating the requests. In some embodiments, services also provide service-specific authorization contexts that are relevant to the actions and resources defined by that service.

As indicated, a principal generally must be authorized to complete a given request sent to a web service of the cloud provider network 100. During authorization, a service uses values from the request context to check for policies 122 that apply to the request. In some embodiments, a policy is a data object (e.g., a JSON-formatted document) that can be associated with an identity or resource (e.g., a user, group of users, a role, or a resource) and defines the permissions associated with the identity or resource. To perform such request authorizations, in some embodiments, the services use an authentication and authorization library 112 to obtain policies 122 applicable to the request and to determine whether to allow or deny received requests 128. For example, when a request 128 is received by one of action implementations 114A-114N, the action implementation uses the authentication and authorization library 112 to check each policy that applies to the context of the request and, if any permissions policy includes a denied action, the entire request is denied. Because requests are denied by default, the services may authorize a request only if every part of the request is allowed by the applicable permissions policies.

The security-related behaviors and authorization patterns for each service of a provider network 100 may be documented in web service specifications (e.g., files or data structures), which may contain information about the actions supported by a service, a description of each action's purpose, an access level associated with the action (e.g., write, read, list, permissions management, etc.), one or more associated resources types, available authorization contexts, and the like. As indicated, however, such web service specifications may often include incomplete or incorrect information. According to embodiments described herein, an analysis 130 built on top of an interprocedural data flow analyzer 134 (which may execute on one or more computing device(s) 136) is used to automatically generate authorization and security-related specifications 132. An authorization and security-related specification 132, for example, can include information describing authorization patterns (e.g., identifications of authorization contexts used, instances of authorization calls using an authentication and authorization library 112, etc.) and, in some embodiments, can be used to more readily develop current and correct web service specifications for various web services of a cloud provider network 100.

Figure 2:
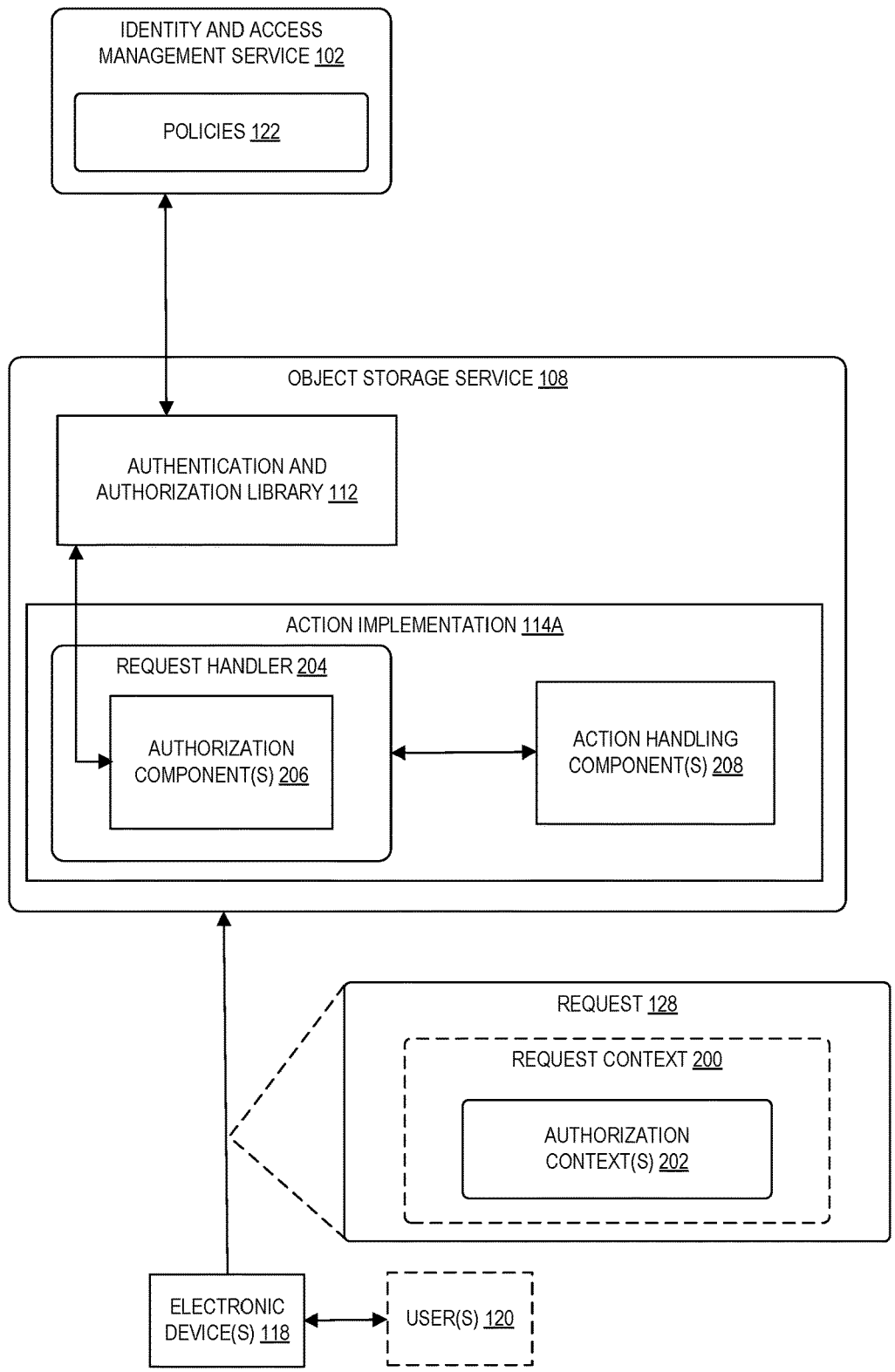
FIG. 2 is a diagram illustrating an implementation of a web service including both request handling components and other action handling components according to some embodiments.

In some embodiments, the analysis of a web service by an interprocedural data flow analyzer 134 more specifically involves the analysis of the implementation of request handlers associated with actions supported by a service (e.g., components of an action implementation that implement a front end for receiving and authorizing action requests). FIG. 2 is a diagram illustrating an implementation of a web service including both request handling-relevant components and other action handling components according to some embodiments. For example, the implementation of a typical web service is large and distributed and thus an analysis of the service's authorization patterns may first involve determining which package or packages contain the front end request handlers for the service. As shown in FIG. 2, an action implementation 114A for an action supported by an object storage service 108 includes a request handler 204 and separate action handling component(s) 208 (e.g., components involved in performing the action other than request processing and authorization), where such a service may include action implementations for any number of separate actions. The interprocedural data flow analyses described herein may largely ignore action handling component(s) 208 (e.g., implementing operations such as writing data to a queue, querying a database, etc.) for the sake of analysis efficiency. As described above, a request handler 204 receives requests 128 from electronic device(s) 118 to perform actions, where such requests may include a request context 200 specifying one or more authorization contexts 202 (e.g., possibly including one or more global authorization contexts, service-specific authorization contexts, or both). The global authorization contexts and service-specific authorization contexts, if supported by the relevant service, can be specified in policies 122 such that authorization context values included in a request context are compared by an action authentication and authorization library 112 with key values specified in any applicable policies 122.

In FIG. 2, the authentication and authorization library 112 provides functionality used by the various web services of a cloud provider network 100 to authenticate and authorize requests received from users and applications. The library 112 may in turn interface with the identity and access management service 102 to make authentication and authorization decisions (e.g., via authentication/authorization requests 124), obtain applicable policy information, and the like. For example, responsive to a request handler 204 calling the library 112 with information derived from a request context 200, the library 112 obtains relevant policies that apply to the relevant principal directly, policies inherited from their organization, etc. As part of the information derived from the request context 200, the request handler 204 may pass various authorization contexts and the library 112 determines, based on obtained policies, whether to deny the request or allow the action implementation to perform the rest of the associated action logic.

Figure 3:
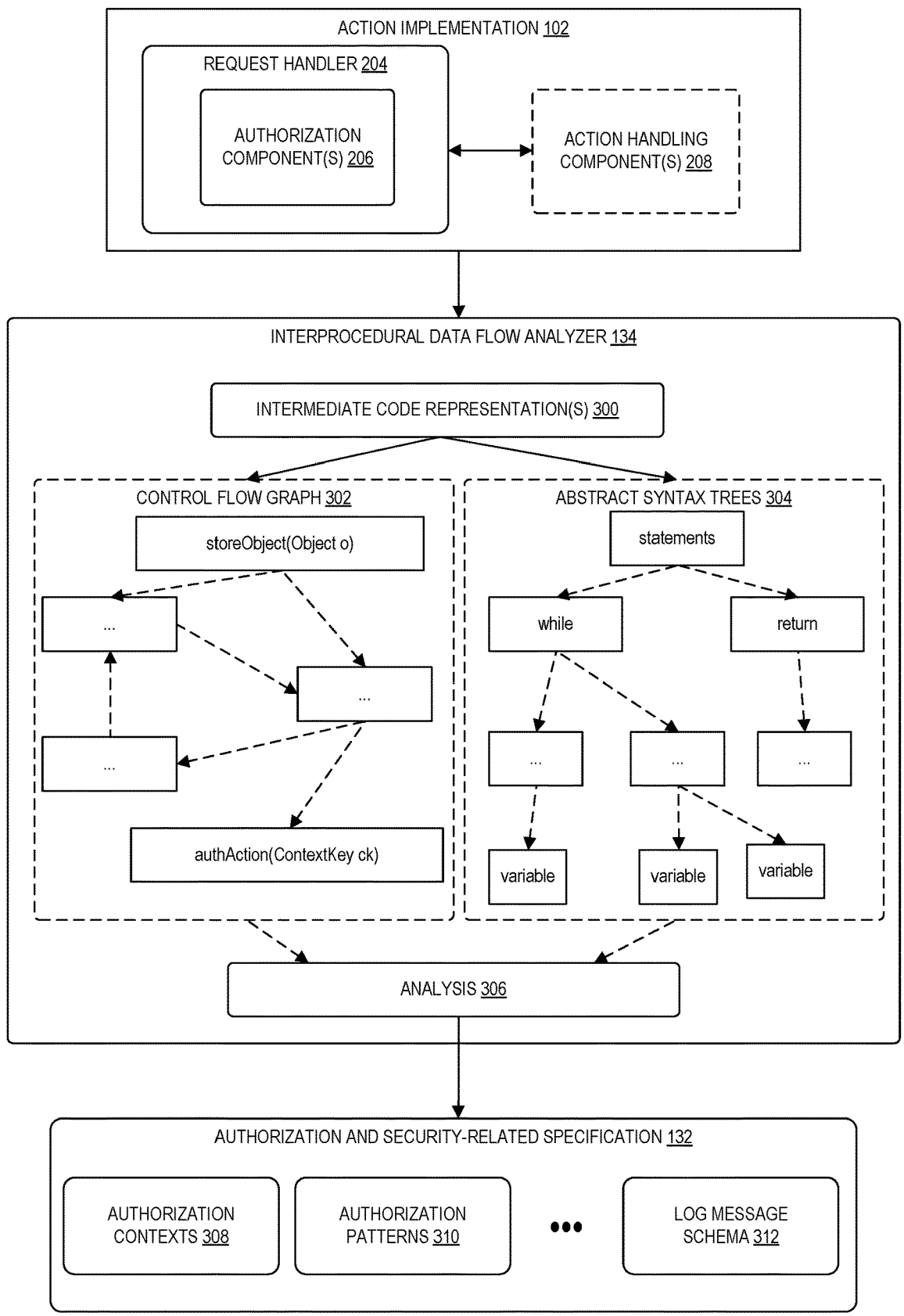
FIG. 3 is a diagram illustrating an example interprocedural data flow analysis of an implementation of a web service request handler to obtain a specification of authorization and other security-related behavior associated with the request handler according to some embodiments.

In some embodiments, once implementations of one or more request handlers are identified, an interprocedural data flow analyzer 134 is used to perform a static analysis of the source code or software development artifacts (e.g., bytecode, intermediate language representations, etc.) to identify security-relevant behavior information. FIG. 3 is a diagram illustrating the performance of an interprocedural data flow analysis of an implementation of a web service according to some embodiments. In some embodiments, an interprocedural data flow analyzer 134 is used to obtain a model representation of the implementation of a request handler 204 (e.g., including an implementation of one or more authorization component(s) 206). The model representation can include, for example, one or more intermediate code representation(s) 300, one or more control flow graphs 302, one or more abstract syntax trees 304, or other model representations of the code implementing the request handler. In some embodiments, the interprocedural data flow analyzer 134 includes use of the Soot bytecode manipulation and optimization framework, the Boomerang context and flow-sensitive pointer analysis framework, or any other such data flow analysis tools, each of which may assist in the generation of the model representations and provide interfaces for performing analyses involving the generated model representations.

In some embodiments, an analysis 306 is built on top of the interprocedural data flow analyzer 134 and is configured to propagate information about properties of interest (e.g., information associated with authorization and other security-related behavior of the request handler 204) through a model representation of the program (e.g., models constructed based on the intermediate code representation(s) 300, control flow graphs 302, abstract syntax trees 304, or combinations thereof). For example, the analysis 306 can include the definition of flow functions and other analysis attributes that determine the interaction of statements with a data flow fact. In some embodiments, the analysis 306 includes an interprocedural finite distribute subset (IFDS)

analysis, which is an analysis based on a finite set of data flow facts and distribute data flow functions. In some embodiments, an IFDS analysis transforms a data flow problem into a graph reachability problem. For example, reachability may be computed using a so called exploded super-graph (ESG). In other embodiments, other types of analyses are performed such as a flow-sensitive pointer analysis and the like.

IFDS, for example, is an interprocedural analysis framework on top of Soot to allow analyses to propagate certain types of facts (defined in virtually any manner, subject to some algebraic constraints) across the dataflow of a program. A specific analysis using IFDS implements a Java interface called Flow Functions that define how facts get generated and how the facts propagate across different program constructs. In particular, an IFDS analysis specifies how facts propagate during normal non-branching control flow of a program, as well as how they propagate into function calls, how they propagate from return values, and then how facts are affected in the caller after a function returns.

In some embodiments, facts of an analysis 306 store a tiny AST for how authorization contexts (e.g., condition key names such as csp:userid or ss:prefix) are assembled since they are often computed on-the-fly in a program by concatenating the service name with a key name after a colon, or sometimes with dynamically generated values. In some embodiments, an analysis's 306 flow functions take care of taking potential sources of authorization contexts and making sure they flow through service code so that if a known authorization context consumer (e.g., the authentication and authorization library 112 for example) gets passed a value that appears to have a known authorization context fact associated with it, the analysis tallies those up and can report on them, along with relevant source code locations that the values flowed through to get there.

In some embodiments, in an analysis 306 involving the Boomerang framework, the building blocks of the analysis are so-called forward and backward queries. Backward queries, for example, indicate potential places where a Soot variable was allocated (potentially subject to provenance constraints), whereas forward queries indicate how an allocated variable gets manipulated. Analyses that use Boomerang, for example, typically bounce back and forth between those two types of queries to achieve their goal.

In some embodiments, an analysis 306 uses various forms of static analysis to figure out where authorization happens in a web service and then, once the analysis has pinned down, e.g., the specific method that returns the authorization information for a particular API handler, it uses a Boomerang backward query to learn where that returned value got allocated. It then iteratively bounces back and forth between forward and backward queries to build up one or more (if multiple authorization contexts are returned or there's branching logic) ASTs annotated with source locations. Those ASTs can then be partially evaluated (sometimes leaving symbolic placeholders if the value cannot be statically determined) to generate some or all of the authorization and security-related specification 132. The specification can be post-processed to extract authorization contexts (e.g., condition keys, policy variables, etc.), values the authorization contexts get set to, or other more detailed metadata about how authorization works.

In general, the interprocedural data flow analyzer 134 and analysis 306 take as input bytecode or other software development artifacts (including an identification of classes, methods, etc., relevant to the analysis, data flow facts and data flow functions, etc.) and generates an authorization and security-related specification 132 describing various security-related behaviors of a request handler 203 including, e.g., an identification of authorization contexts 308 used by the request handler, descriptions of authorization patterns 310 (e.g., including calls to an authentication and authorization library 112, locations in code where authorization calls are made and authorization contexts are used, locations in code where calls to account activity monitoring services are made, logging schemas, etc.).

Figure 4:
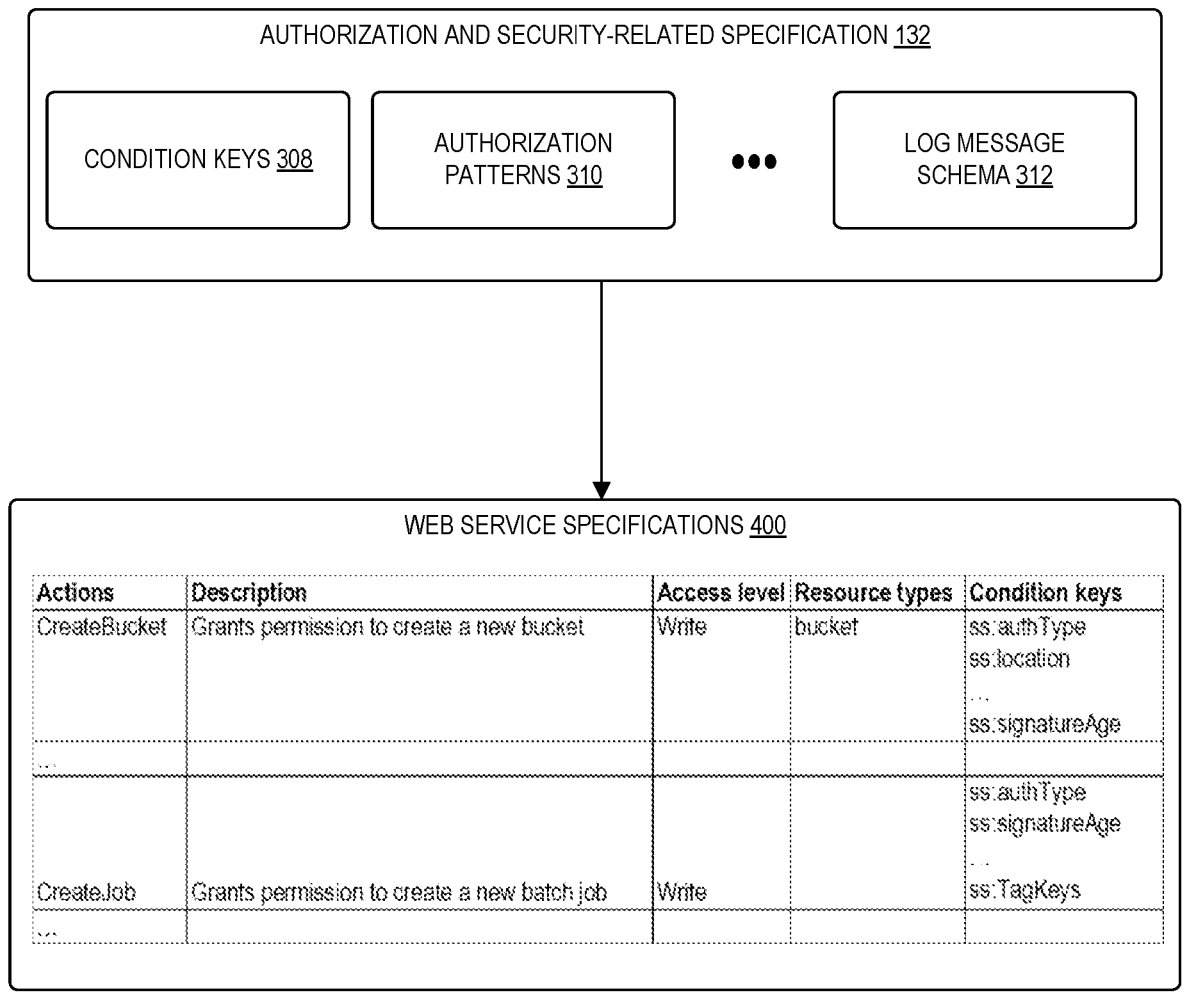
FIG. 4 illustrates an example of generating web service specifications from a specification of authorization and other security-related behavior obtained via an interprocedural analysis of a web service implementation according to some embodiments.

FIG. 4 illustrates an example of generating service description data from a specification of authorization and other security-related behavior obtained via an interprocedural analysis of a web service implementation according to some embodiments. As indicated, the output of the analysis of a web service can include an authorization and security-related specification 132 indicating various types of authorization and other security-related behavior information such as, for example, an identification of authorization contexts 308, data types or formats associated with the authorization contexts 308, authorization patterns 310, identifications of calls to an account activity logging service 104 (e.g., logging requests 126), a log message schema 312, and the like.

In some embodiments, some or all of the data contained in an authorization and security-related specification 132 can be used to create or compare against web service specifications 400 for a web service. As indicated, the web service specifications 400 attempt to describe security-related information about a web service, including available actions and associated information in a structured or semi-structured data format that can be used to display in the information in various types of interfaces (e.g., web-based interfaces, application interfaces, CLIs, etc.). In some embodiments, web service specifications 400 are stored in one or more JSON files and include a structured representation of the actions, the list of resources that the actions act upon, and a list of the authorization contexts that they support, along with other metadata.

In some embodiments, the use of the authorization and security-related specification 132 involves identifying conflicts between the generated specification data and data included in existing service description data. For example, an analysis may include identifying at least one conflict between the specification of authorization behavior associated with a request handler and a web service specification, where the conflict includes at least one of: an indication of an authorization context omitted in the web service specification (e.g., because a developer associated with the service neglected to document the use of the authorization context), an indication of an authorization context in the web service specification that is unused by the request handler (e.g., because a developer neglected to remove a deprecated authorization context from the file), or an indication of an authorization context in the service file associated with incorrect information (e.g., because a developer associated an authorization context with an incorrect data type or other information).

In some embodiments, an authorization and security-related specification 132 can be used to automatically generate at least a portion of the service description data associated with a web service. For example, once an authorization and security-related specification 132 is generated, an analysis can further generate at least a portion of a web service specification based on the specification of authorization behavior associated with the request handler (e.g., by automatically generating JSON or otherwise-formatted text describing the authorization and security-related specification 132 information), where the web service specification may include an identifier of at least one authorization context used by the request handler or any other relevant security and authorization information.

In some embodiments, the authorization and security-related specification 132 can include authorization patterns 310 indicating, e.g., which actions of a web service use which conditions keys (e.g., where at least one same authorization context may be used by a plurality of separate actions of a web service). The authorization patterns 310 information can also include, for example, information identifying a location in the source code or software development artifacts associated with a web service where an authorization context is used by the request handler (e.g., to set or modify the authorization context, to pass the authorization context to the authentication and authorization library 112, etc.). The authorization patterns 310 information can further include an identification of locations in the request handler implementation where authorization calls are made to the authentication and authorization library 112 (e.g., where a request handler for a single action can include one or more separate authorization calls, include subordinate authorization calls, etc.), and further an indication of a trace through the implementation involved in the authorization calls.

In some embodiments, the authorization and security-related specification 132 further includes an indication of whether the request handler interacts with an account activity logging service 104 of the cloud provider network 100 (e.g., to identify request handlers that have inadvertently neglected to include desirable account activity logging functionality). In some embodiments, the authorization and security-related specification 132 further includes an identification of a message schema associated with messages sent by the request handler to the account activity logging service 104 of the cloud provider network 100.

Figure 5:
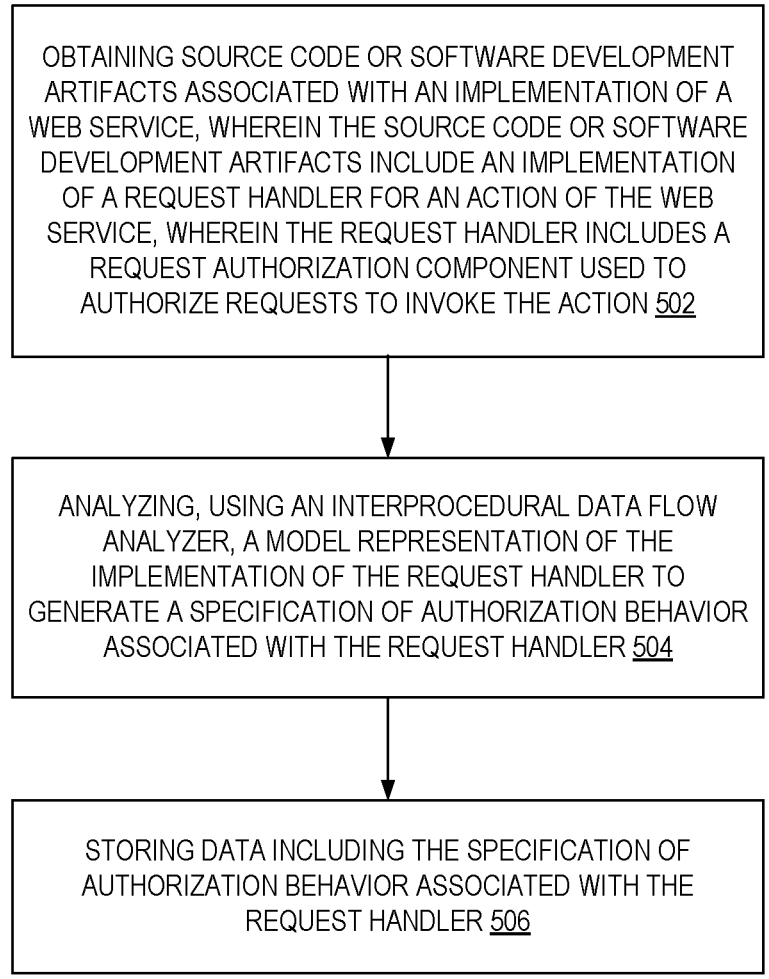
FIG. 5 is a flow diagram illustrating operations of a method for performing an interprocedural data flow analysis of an implementation of a web service to obtain a specification of authorization and other security-related behavior associated with the web service according to some embodiments.

FIG. 5 is a flow diagram illustrating operations 500 of a method for performing an interprocedural data flow analysis of an implementation of a web service to obtain a specification of authorization and other security-related behavior associated with the web service according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by interprocedural data flow analyzer 134 and analysis 130 of the other figures.

The operations 500 include, at block 502, obtaining source code or software development artifacts associated with an implementation of a web service, wherein the source code or software development artifacts include an implementation of a request handler for an action of the web service, wherein the request handler includes a request authorization component used to authorize requests to invoke the action.

The operations 500 further include, at block 504, analyzing, using an interprocedural data flow analyzer, a model representation of the implementation of the request handler to generate a specification of authorization behavior associated with the request handler.

The operations 500 further include, at block 506, storing data including the specification of authorization behavior associated with the request handler.

In some embodiments, the specification of authorization behavior identifies one or more authorization contexts, wherein the request authorization component uses the one or more authorization contexts to authorize requests to invoke the action, and wherein an authorization context is a key-value pair included in requests to the web service and used to evaluate access policies for principals generating the requests.

In some embodiments, the specification of the authorization behavior further includes at least one of: an indication of a data type or data format associated with an authorization context of the one or more authorization contexts, an identification of one or more authorization calls made by the request authorization component, an identification of a call to an account activity logging service of the cloud provider network, or a message schema associated with log messages sent to the account activity logging service by the request authorization component.

In some embodiments, the analysis performed using the interprocedural data flow analyzer involves at least one of: performing a graph reachability analysis based on an interprocedural control flow graph constructed from the source code or software development artifacts, or performing a flow-sensitive pointer analysis based on the source code or software development artifacts.

In some embodiments, the operations further include identifying at least one conflict between the specification of authorization behavior associated with the request handler and a web service specification, wherein a conflict includes at least one of: an indication of an authorization context omitted in the web service specification, an indication of an authorization context in the web service specification that is unused by the request handler, or an indication of an authorization context in the web service specification associated with incorrect information; and causing display of the at least one conflict.

In some embodiments, the operations further include generating at least a portion of a web service specification based on the specification of authorization behavior associated with the request handler, wherein the web service specification includes an identifier of at least one authorization context used by the request handler.

In some embodiments, the specification of authorization behavior further includes an identification of a plurality of actions of the web service that use a same authorization context.

In some embodiments, the operations further include identifying a location in the source code or software development artifacts where an authorization context of the one or more authorization contexts is used by the request handler.

In some embodiments, the operations further include analyzing, using the interprocedural data flow analyzer, to determine whether the request handler interacts with an account activity logging service of a cloud provider network.

In some embodiments, the operations further include analyzing, using the interprocedural data flow analyzer, to determine a message schema associated with messages sent by the request handler to an account activity logging service of a cloud provider network.

In some embodiments, the model representation of the implementation of the request handler includes at least one of: an intermediate language representation, a control flow diagram, or an abstract syntax tree.

Figure 6:
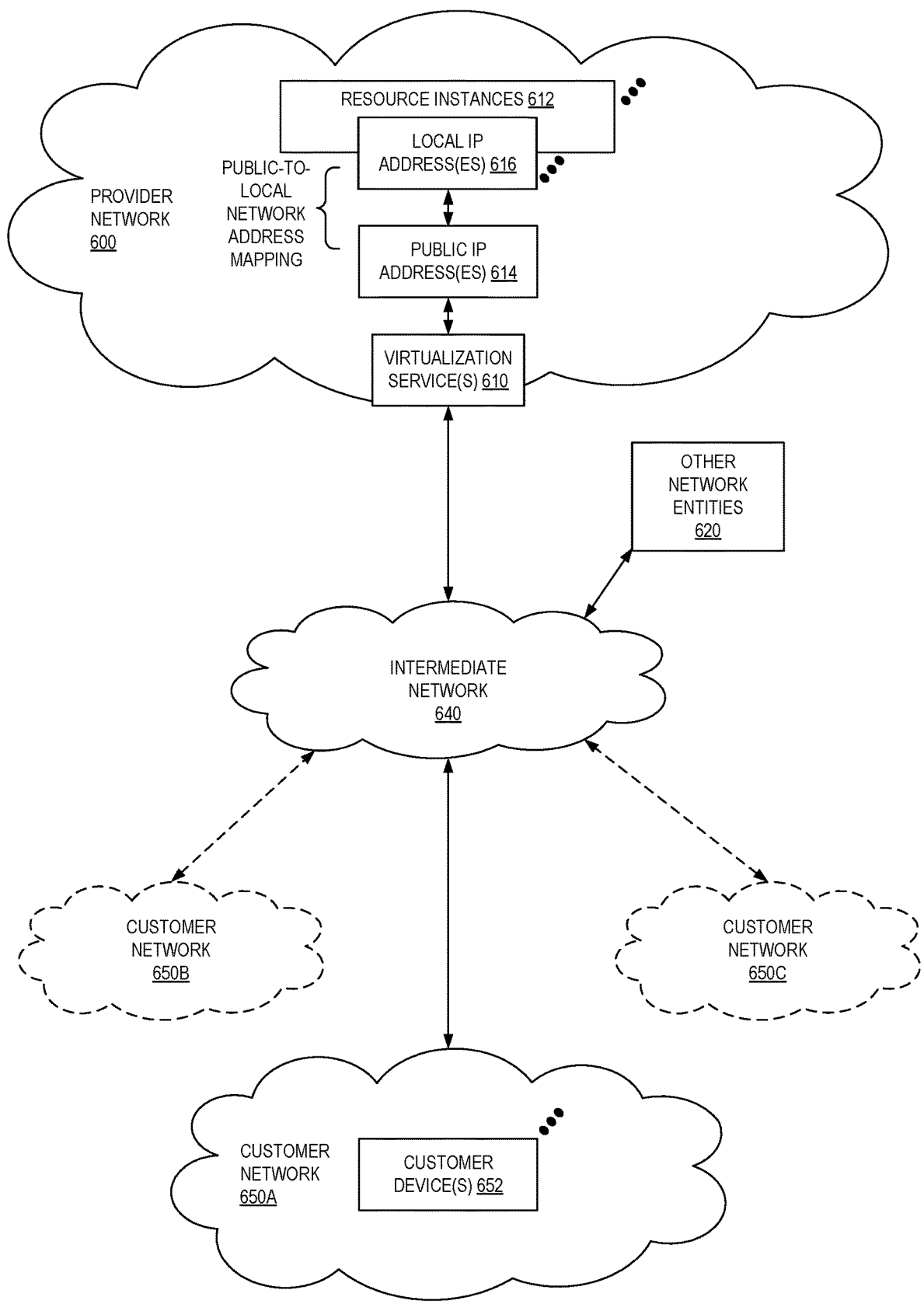
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
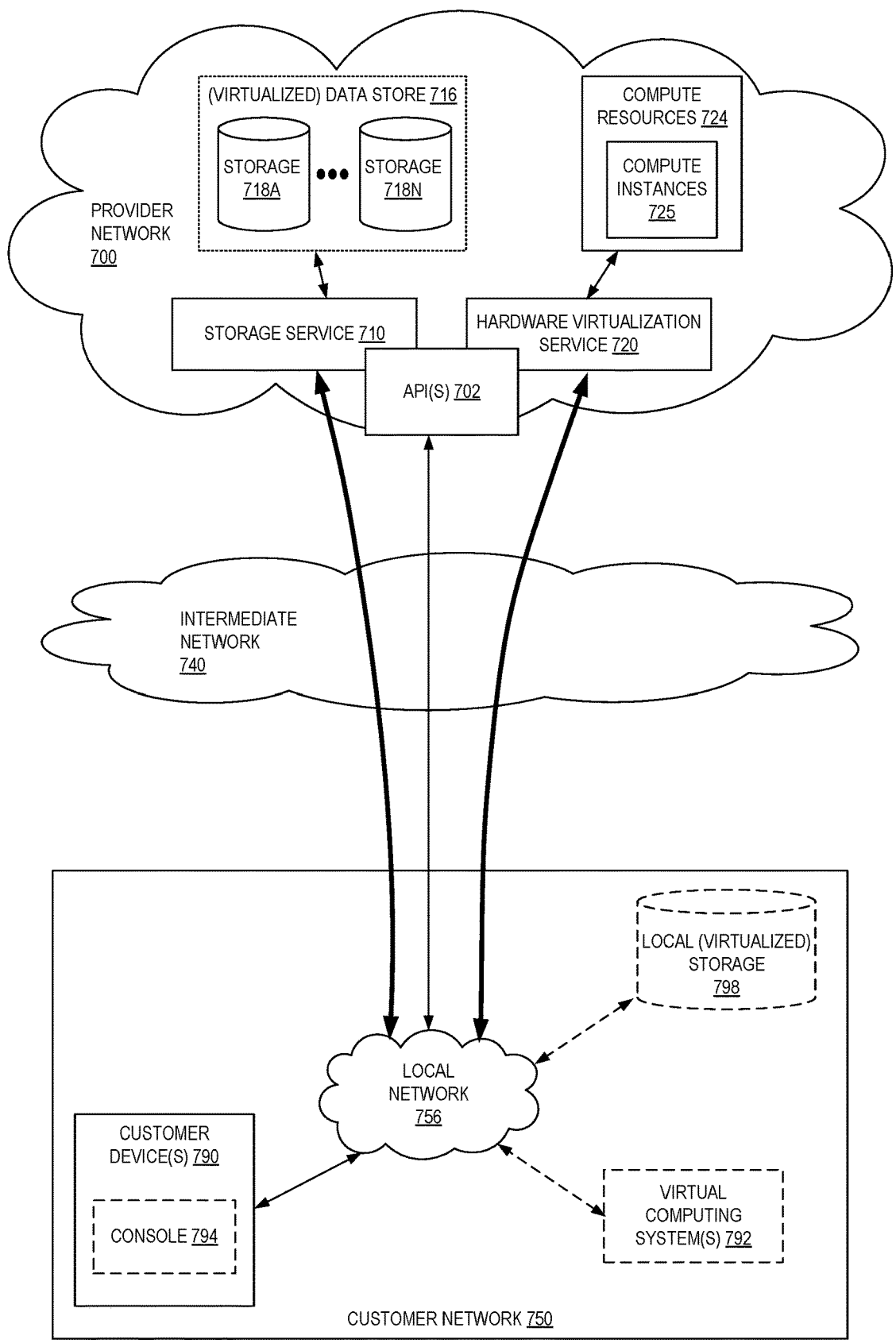
FIG. 7 is a block diagram of an example provider network that provides a storage service and a hardware virtualization service to customers according to some embodiments.

FIG. 7 is a block diagram of an example provider network that provides a storage service and a hardware virtualization service to customers, according to some embodiments. Hardware virtualization service 720 provides multiple compute resources 724 (e.g., compute instances 725 such as VMs) to customers. The compute resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the compute resources 724 to public Internet destinations, and from public Internet sources to the local IP addresses of compute resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
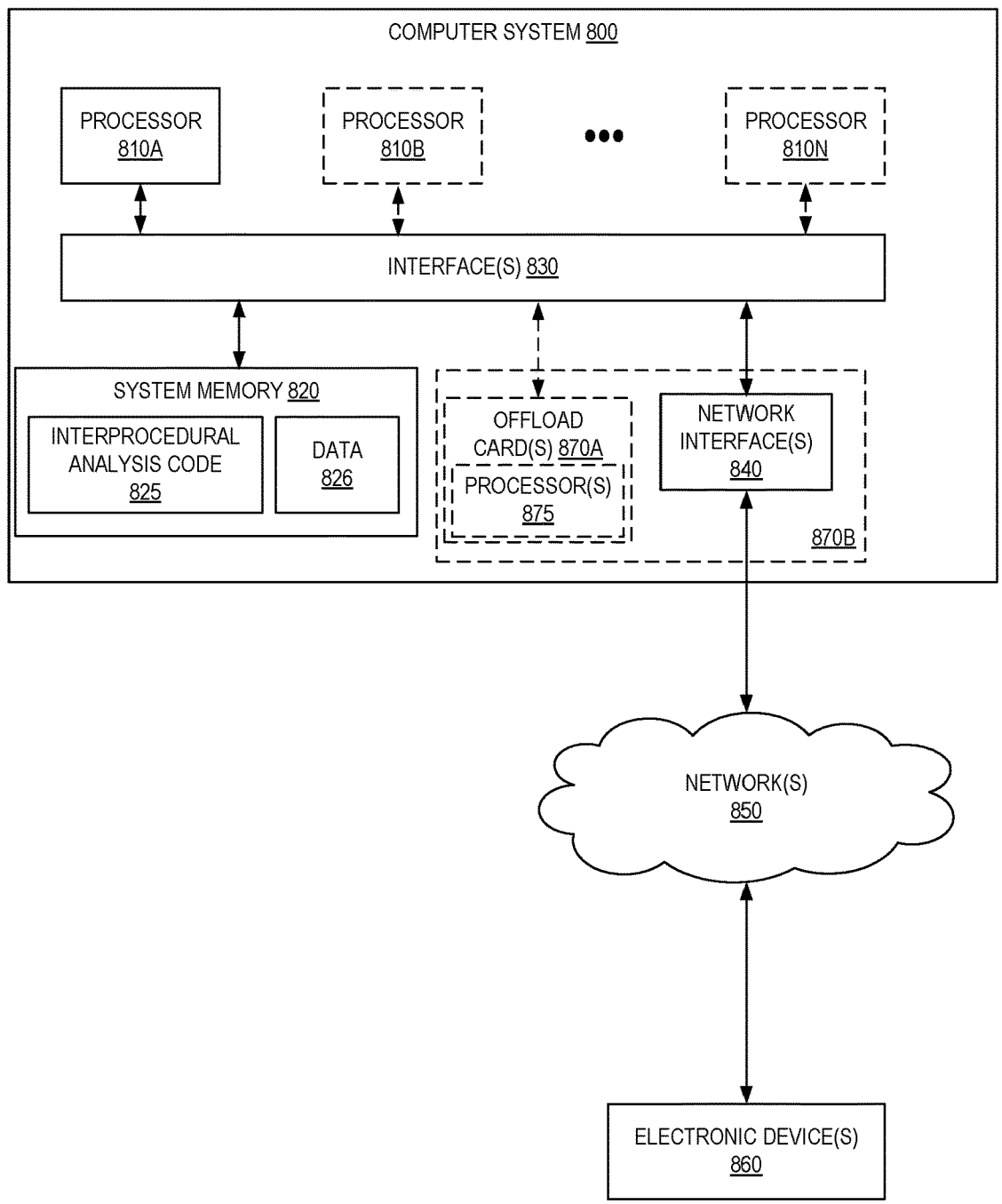
FIG. 8 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as interprocedural analysis code 825 (e.g., executable to implement, in whole or in part, the interprocedural data flow analyzer XXX) and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870A or 870B (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some embodiments the offload card(s) 870A or 870B can perform compute instance management operations such as pausing and/or un-pausing compute instances, launching and/or terminating compute instances, performing memory transfer/copying operations, etc. These management operations may, in some embodiments, be performed by the offload card(s) 870A or 870B in coordination with a hypervisor (e.g., upon a request from a hypervisor) that is executed by the other processors 810A-810N of the computer system 800. However, in some embodiments the virtualization manager implemented by the offload card(s) 870A or 870B can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining source code or software development artifacts associated with an implementation of a web service of a cloud provider network, wherein the source code or the software development artifacts include an implementation of a request handler for an application programming interface (API) action of the web service, wherein the request handler includes a request authorization component used to authorize requests based at least in part on one or more authorization contexts, and wherein an authorization context is a key-value pair included in requests to the web service and used to evaluate access policies for principals generating the requests;
    analyzing, using an interprocedural data flow analyzer, a model representation of the implementation of the request handler to generate a specification of authorization behavior associated with the request handler, wherein the specification of authorization behavior identifies the one or more authorization contexts; and
    causing display of the specification of authorization behavior associated with the request handler, wherein the display includes an indication of the one or more authorization contexts.

2. The computer-implemented method of claim 1, wherein the specification of the authorization behavior further includes at least one of: an indication of a data type or data format associated with an authorization context of the one or more authorization contexts, an identification of one or more authorization calls made by the request authorization component, an identification of a call to an account activity logging service of the cloud provider network, or a message schema associated with log messages sent to the account activity logging service by the request authorization component.

3. The computer-implemented method of claim 1, wherein the analysis performed using the interprocedural data flow analyzer involves at least one of: performing a graph reachability analysis based on an interprocedural control flow graph constructed from the source code or software development artifacts, or performing a flow-sensitive pointer analysis based on the source code or software development artifacts.

4. A computer-implemented method comprising:
    obtaining source code or software development artifacts associated with an implementation of a web service, wherein the source code or software development artifacts include an implementation of a request handler for an action of the web service, wherein the request handler includes a request authorization component used to authorize requests to invoke the action;
    analyzing, using an interprocedural data flow analyzer, a model representation of the implementation of the request handler to generate a specification of authorization behavior associated with the request handler; and
    storing data including the specification of authorization behavior associated with the request handler.

5. The computer-implemented method of claim 4, wherein the specification of authorization behavior identifies one or more authorization contexts, wherein the request authorization component uses the one or more authorization contexts to authorize requests to invoke the action, and wherein an authorization context is a key-value pair included in requests to the web service and used to evaluate access policies for principals generating the requests.

6. The computer-implemented method of claim 5, wherein the specification of the authorization behavior further includes at least one of: an indication of a data type or data format associated with an authorization context of the one or more authorization contexts, an identification of one or more authorization calls made by the request authorization component, an identification of a call to an account activity logging service of a cloud provider network, or a message schema associated with log messages sent to the account activity logging service by the request authorization component.

7. The computer-implemented method of claim 4, wherein the analysis performed using the interprocedural data flow analyzer involves at least one of: performing a graph reachability analysis based on an interprocedural control flow graph constructed from the source code or software development artifacts, or performing a flow-sensitive pointer analysis based on the source code or software development artifacts.

8. The computer-implemented method of claim 4, further comprising:
identifying at least one conflict between the specification of authorization behavior associated with the request handler and a web service specification, wherein a conflict includes at least one of: an indication of an authorization context omitted in the web service specification, an indication of an authorization context in the web service specification that is unused by the request handler, or an indication of an authorization context in the web service specification associated with incorrect information; and
causing display of the at least one conflict.

9. The computer-implemented method of claim 4, further comprising generating at least a portion of a web service specification based on the specification of authorization behavior associated with the request handler, wherein the web service specification includes an identifier of at least one authorization context used by the request handler.

10. The computer-implemented method of claim 4, wherein the specification of authorization behavior further includes an identification of a plurality of actions of the web service that use a same authorization context.

11. The computer-implemented method of claim 5, further comprising identifying a location in the source code or software development artifacts where an authorization context of the one or more authorization contexts is used by the request handler.

12. The computer-implemented method of claim 4, further comprising analyzing, using the interprocedural data flow analyzer, to determine whether the request handler interacts with an account activity logging service of a cloud provider network.

13. The computer-implemented method of claim 4, further comprising analyzing, using the interprocedural data flow analyzer, to determine a message schema associated with messages sent by the request handler to an account activity logging service of a cloud provider network.

14. The computer-implemented method of claim 4, wherein the model representation of the implementation of the request handler includes at least one of: an intermediate language representation, a control flow diagram, or an abstract syntax tree.

15. A system comprising:
a first one or more electronic devices to implement a web service in a multi-tenant provider network, wherein the web service is associated with source code or software development artifacts implementing the web service; and
a second one or more electronic devices to implement an interprocedural data flow analysis tool, the interprocedural data flow analysis tool including instructions that upon execution cause the interprocedural data flow analysis tool to:
obtain the source code or software development artifacts associated with an implementation of the web service, wherein the source code or software development artifacts include an implementation of a request handler for an action of the web service, wherein the request handler includes a request authorization component used to authorize requests to invoke the action;
analyze, using an interprocedural data flow analyzer, a model representation of the implementation of the request handler to generate a specification of authorization behavior associated with the request handler; and
store data including the specification of authorization behavior associated with the request handler.

16. The system of claim 15, wherein the specification of authorization behavior identifies one or more authorization contexts, wherein the request authorization component uses the one or more authorization contexts to authorize requests to invoke the action, and wherein an authorization context is a key-value pair included in requests to the web service and used to evaluate access policies for principals generating the requests.

17. The system of claim 15, further comprising:
identifying at least one conflict between the specification of authorization behavior associated with the request handler and a web service specification, wherein a conflict includes at least one of: an indication of an authorization context omitted in the web service specification, an indication of an authorization context in the web service specification that is unused by the request handler; and
causing display of the at least one conflict.

18. The system of claim 15, further comprising generating a web service specification based on the specification of authorization behavior associated with the request handler, wherein the web service specification includes an identifier of at least one authorization context used by the request handler.

19. The system of claim 15, wherein the specification of authorization behavior further includes an identification of a plurality of actions of the web service that use a same authorization context.

20. The system of claim 16, further comprising identifying a location in the source code or software development artifact where an authorization context of the one or more authorization contexts is used by the request handler.

* * * * *